US008444787B2

(12) United States Patent
Wittbold et al.

(10) Patent No.: US 8,444,787 B2
(45) Date of Patent: *May 21, 2013

(54) METHODS OF AND SYSTEMS FOR ADDING A HIGH VISCOSITY GYPSUM ADDITIVE TO A POST-MIXER AQUEOUS DISPERSION OF CALCINED GYPSUM

(75) Inventors: James R. Wittbold, Des Plaines, IL (US); W. David Song, Vernon Hills, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/208,154

(22) Filed: Aug. 11, 2011

(65) Prior Publication Data

US 2011/0308432 A1  Dec. 22, 2011

Related U.S. Application Data

(62) Division of application No. 11/116,809, filed on Apr. 27, 2005, now Pat. No. 8,016,960.

(51) Int. Cl.
*C04B 9/04* (2006.01)
*C04B 11/00* (2006.01)
*C04B 28/14* (2006.01)
*B29C 65/00* (2006.01)
*B32B 13/00* (2006.01)
*B32B 37/00* (2006.01)

(52) U.S. Cl.
USPC ............ 156/39; 106/772; 106/773; 106/774; 106/775; 106/776; 366/192; 366/193; 366/194

(58) Field of Classification Search
USPC ............ 106/772, 773, 774, 775, 776; 156/39; 366/192, 193, 194
See application file for complete search history.

(56) References Cited

U.S. PATENT DOCUMENTS

| 624,687 | A | 5/1899 | Sackett |
| 1,489,693 | A | 4/1924 | Brookby |
| 1,500,452 | A | 7/1924 | Haggerty |
| 1,620,067 | A | 3/1927 | Brookby et al. |
| RE16,860 | E | 1/1928 | Armstrong |
| 1,719,726 | A | 7/1929 | Raynes |

(Continued)

FOREIGN PATENT DOCUMENTS

| EP | 742179 A1 | 11/1996 |
| GB | 1378695 A | 12/1974 |

(Continued)

OTHER PUBLICATIONS

U.S. Appl. No. 60/688,839, filed Jun. 9, 2005, Yu.

(Continued)

*Primary Examiner* — Michael Orlando
(74) *Attorney, Agent, or Firm* — Leydig, Voit & Mayer, Ltd.; Philip T. Petti; David F. Janci

(57) ABSTRACT

Provided are methods and systems for introducing a wet gypsum accelerator or other high viscosity production additive to an aqueous dispersion of calcined gypsum in a discharge apparatus downstream of a stucco mixer in which the dispersion was prepared. These methods and systems are useful in the production of various gypsum products such as board including wallboard and ceiling tiles.

10 Claims, 10 Drawing Sheets

U.S. PATENT DOCUMENTS

| | | | |
|---|---|---|---|
| 1,733,741 A | 10/1929 | Lovett | |
| 1,758,200 A | 5/1930 | Pfeffer et al. | |
| 1,764,824 A | 6/1930 | Brookby et al. | |
| 1,767,791 A | 6/1930 | Gough et al. | |
| 1,813,828 A | 7/1931 | Turner et al. | |
| 2,079,565 A | 5/1937 | Roos et al. | |
| 2,089,087 A | 8/1937 | Fletcher | |
| 2,097,088 A | 10/1937 | Mills | |
| 2,207,339 A | 7/1940 | Camp | |
| 2,220,683 A | 11/1940 | Knode | |
| 2,220,684 A | 11/1940 | Knode et al. | |
| 2,253,059 A | 8/1941 | Camp | |
| 2,301,597 A | 11/1942 | Welty et al. | |
| 2,346,999 A | 4/1944 | Briscoe et al. | |
| 2,512,163 A | 6/1950 | Mallory | |
| 2,538,891 A | 1/1951 | Zimmerman et al. | |
| 2,574,238 A | 11/1951 | Bean et al. | |
| 2,625,381 A | 1/1953 | Zimmerman et al. | |
| 2,639,901 A | 5/1953 | Teale | |
| 2,641,453 A | 6/1953 | Teale | |
| 2,660,416 A | 11/1953 | Camp et al. | |
| 2,762,738 A | 9/1956 | Teale | |
| 2,862,829 A | 12/1958 | Dixon et al. | |
| 2,985,219 A | 5/1961 | Summerfield | |
| 3,173,663 A | 3/1965 | Schoonover | |
| 3,262,799 A | 7/1966 | McCleary et al. | |
| 3,343,818 A | 9/1967 | Plemons et al. | |
| 3,359,146 A | 12/1967 | Lane et al. | |
| 3,459,620 A | 8/1969 | McCleary et al. | |
| 3,573,947 A | 4/1971 | Kinkade et al. | |
| 3,666,581 A | 5/1972 | Lane et al. | |
| 3,947,285 A | 3/1976 | Jones et al. | |
| 4,009,062 A | 2/1977 | Long | |
| 4,054,461 A | 10/1977 | Martin | |
| 4,176,972 A | 12/1979 | Stiling | |
| 4,183,908 A | 1/1980 | Rolfe | |
| 4,184,771 A | 1/1980 | Day | |
| 4,279,673 A | 7/1981 | White et al. | |
| 4,288,263 A | 9/1981 | Delcoigne et al. | |
| 4,354,885 A | 10/1982 | White | |
| 4,364,790 A | 12/1982 | Delcoigne et al. | |
| 4,612,766 A | 9/1986 | Eder | |
| 4,812,045 A | 3/1989 | Rivers | |
| 4,820,053 A | 4/1989 | Rivers | |
| 4,995,729 A | 2/1991 | Eberhardt et al. | |
| 5,071,257 A | 12/1991 | Hasenpath et al. | |
| 5,286,425 A | 2/1994 | Babcock et al. | |
| 5,366,547 A | 11/1994 | Brabston et al. | |
| 5,560,774 A | 10/1996 | Burge et al. | |
| 5,643,510 A | 7/1997 | Sucech | |
| 5,683,635 A | 11/1997 | Sucech et al. | |
| 5,714,032 A | 2/1998 | Ainsley et al. | |
| 5,718,797 A | 2/1998 | Phillips et al. | |
| 6,019,919 A | 2/2000 | Sulzbach et al. | |
| 6,036,740 A | 3/2000 | Miller et al. | |
| 6,059,444 A | 5/2000 | Johnson et al. | |
| 6,158,677 A | 12/2000 | Coles | |
| 6,193,408 B1 | 2/2001 | Miura et al. | |
| 6,342,284 B1 | 1/2002 | Yu et al. | |
| 6,379,458 B1 | 4/2002 | Immordino et al. | |
| 6,409,824 B1 | 6/2002 | Veeramasuneni et al. | |
| 6,409,825 B1 | 6/2002 | Yu et al. | |
| 6,494,609 B1 | 12/2002 | Wittbold et al. | |
| 6,632,550 B1 | 10/2003 | Yu et al. | |
| 6,800,131 B2 | 10/2004 | Yu et al. | |
| 6,874,930 B2 | 4/2005 | Wittbold et al. | |
| 7,718,019 B2 | 5/2010 | Wittbold et al. | |
| 7,731,794 B2 | 6/2010 | Yu | |
| 7,736,720 B2 | 6/2010 | Yu | |
| 7,771,851 B2 | 8/2010 | Song | |
| 2003/0117891 A1 | 6/2003 | Wittbold et al. | |
| 2004/0092625 A1* | 5/2004 | Pollock et al. | 524/42 |
| 2006/0278132 A1 | 12/2006 | Yu | |
| 2007/0048490 A1 | 3/2007 | Yu | |
| 2007/0251628 A1 | 11/2007 | Yu | |
| 2008/0070026 A1 | 3/2008 | Yu | |
| 2008/0090068 A1 | 4/2008 | Yu | |
| 2010/0061180 A1 | 3/2010 | Yu | |
| 2010/0139528 A1 | 6/2010 | Yu | |
| 2010/0239886 A1 | 9/2010 | Yu | |
| 2011/0195241 A1 | 8/2011 | Yu | |

FOREIGN PATENT DOCUMENTS

| | | |
|---|---|---|
| JP | 08-025342 | 1/1996 |
| JP | 08-325047 | 12/1996 |
| JP | 11-501002 T | 1/1999 |
| KZ | 12387 A | 12/2002 |
| KZ | 19573 A | 6/2008 |
| RU | 2125029 C1 | 1/1999 |
| SU | 734159 A | 5/1980 |
| WO | WO 97-23337 A1 | 7/1997 |
| WO | WO 99/08979 A1 | 2/1999 |
| WO | WO 00/06518 A1 | 2/2000 |
| WO | WO 02/098646 A1 | 12/2002 |
| WO | WO 2005/092583 A1 | 10/2005 |

OTHER PUBLICATIONS

U.S. Appl. No. 61/446,941, filed Feb. 25, 2011, Yu.
U.S. Appl. No. 11/116,549, filed Apr. 27, 2005, Wittbold et al.
U.S. Appl. No. 11/116,550, filed Apr. 27, 2005, Yu et al.
Beretka et al., "Studies on the Reactivity and Physical Properties of Calcined Gypsum as a Function of Time and Temperature," (1983).
Fox Valve Development Corp., "Fox Slurry Eductors," www.foxvalve.com/main.html (accessed Apr. 26, 2005).
International Search Report from International Patent Application No. PCT/US05/14504 (Nov. 2, 2006).
Jyoti Ceramic Inds. P. Ltd., *Zirconox Micro Milling Beads with Macro Grinding and Dispersion Capabilities*, Product Brochure (dated at least Oct. 7, 2003).
Lane et al., *Ceramic Bulletin*, 54 (3), 291-294 & 303 (1975).
The Great Soviet Encyclopedia; 1974; pp. 304, 307; vol. 17; Moscow.
Volzhensky A.V. et al.; Gypsum binders and products; 1974; pp. 174-176; Moscow.

* cited by examiner

METHODS OF AND SYSTEMS FOR ADDING A HIGH VISCOSITY GYPSUM ADDITIVE TO A POST-MIXER AQUEOUS DISPERSION OF CALCINED GYPSUM

CROSS-REFERENCE TO RELATED APPLICATIONS

This patent application is a divisional patent application of U.S. patent application Ser. No. 11/116,809, filed Apr. 27, 2005 now U.S. Pat. No. 8,016,960, which is hereby incorporated by reference in its entirety.

BACKGROUND OF THE INVENTION

Set gypsum (calcium sulfate dihydrate) is a well-known material that is included commonly in many types of products, such as gypsum board employed in typical drywall construction of interior walls and ceilings of buildings. Typically, gypsum-containing board is prepared by forming a mixture of calcined gypsum, that is, calcium sulfate hemihydrate and/or calcium sulfate anhydrite, and water, as well as other components, as desired. The mixture typically is cast into a pre-determined shape on the surface of a conveyor or in a tray. As it travels along the conveyor, the calcined gypsum reacts with water to form a matrix of crystalline hydrated gypsum or calcium sulfate dihydrate. The desired hydration of the calcined gypsum is what enables the formation of an interlocking matrix of set gypsum crystals, thereby imparting strength to the gypsum structure in the gypsum-containing product. Mild heating can be used to drive off unreacted water to yield a dry product. Gypsum mixers and methods of producing gypsum products are described, for example, in U.S. Pat. Nos. 1,767,791; 2,253,059; 2,346,999; 4,183,908; 5,683,635; 5,714,032; and 6,494,609.

Accelerator materials are commonly used in the production of gypsum products to enhance the efficiency of hydration and to control set time. Accelerators are described, for example in U.S. Pat. Nos. 3,573,947; 3,947,285; 4,054,461; and 6,409,825. Some accelerators include finely ground dry calcium sulfate dihydrate, known as "gypsum seeds." The gypsum seeds enhance nucleation of the set gypsum crystals, thereby increasing the crystallization rate thereof. Traditionally, accelerators have been added to the same mixer chamber as that used to combine water with calcined gypsum. While addition of accelerator to the mixer has the advantage of mixing the accelerator well and evenly throughout the water and calcined gypsum mixture, the accelerator can also cause the gypsum to begin setting prematurely. Premature setting can cause the mixer to clog, can cause damage to the mixer, limits efficiency, and necessitates more frequent mixer cleaning. Mixer cleaning requires shutting down a board line with a serious detriment to productivity. Although additives including retarders have been used in the mixer to combat premature setting, such additives contribute additional costs and considerations.

Accordingly, new materials and methods are needed to aid in gypsum setting.

BRIEF SUMMARY OF THE INVENTION

According to one aspect of the preset invention, a method of introducing a wet gypsum accelerator (WGA) to a post-mixer aqueous dispersion of calcined gypsum is provided. An aqueous dispersion of calcined gypsum is formed in a mixer chamber of a stucco mixer and discharged into a discharge apparatus. WGA is introduced into the aqueous dispersion within the discharge apparatus.

According to another aspect of the preset invention, a method of introducing a high viscosity production additive to a post-mixer aqueous dispersion of calcined gypsum is provided. An aqueous dispersion of calcined gypsum is formed in a mixer chamber and discharged into a discharge apparatus. The high viscosity production additive is introduced into the aqueous dispersion within the discharge apparatus. The ratio of the viscosity of the high viscosity production additive to the aqueous dispersion is between about 10:1 to about 2:1.

A system for introducing a wet gypsum accelerator to a post-mixer aqueous dispersion of calcined gypsum is provided as an aspect of the present invention. The system includes at least a source of WGA; a delivery device; a mixer for forming an aqueous dispersion of calcined gypsum; a discharge apparatus operatively associated with an outlet of the mixer—the source, delivery device and the discharge apparatus operatively associated with each other.

For example, the present invention has particular utility in the preparation of gypsum board such as wallboard or ceiling tile. In such embodiments, after the high viscosity production additive such as WGA is added to the aqueous dispersion of calcined gypsum, the dispersion is deposited onto a moving coversheet. In the case of wallboard, a second coversheet is applied to the deposited contents prior to drying. In some embodiments, such as some ceiling tile, a second coversheet is not employed.

The present invention's methods, systems, and elements thereof are further described in the drawings and detailed description, which provide representative embodiments.

BRIEF DESCRIPTION OF THE SEVERAL VIEWS OF THE DRAWING(S)

Figure 1:
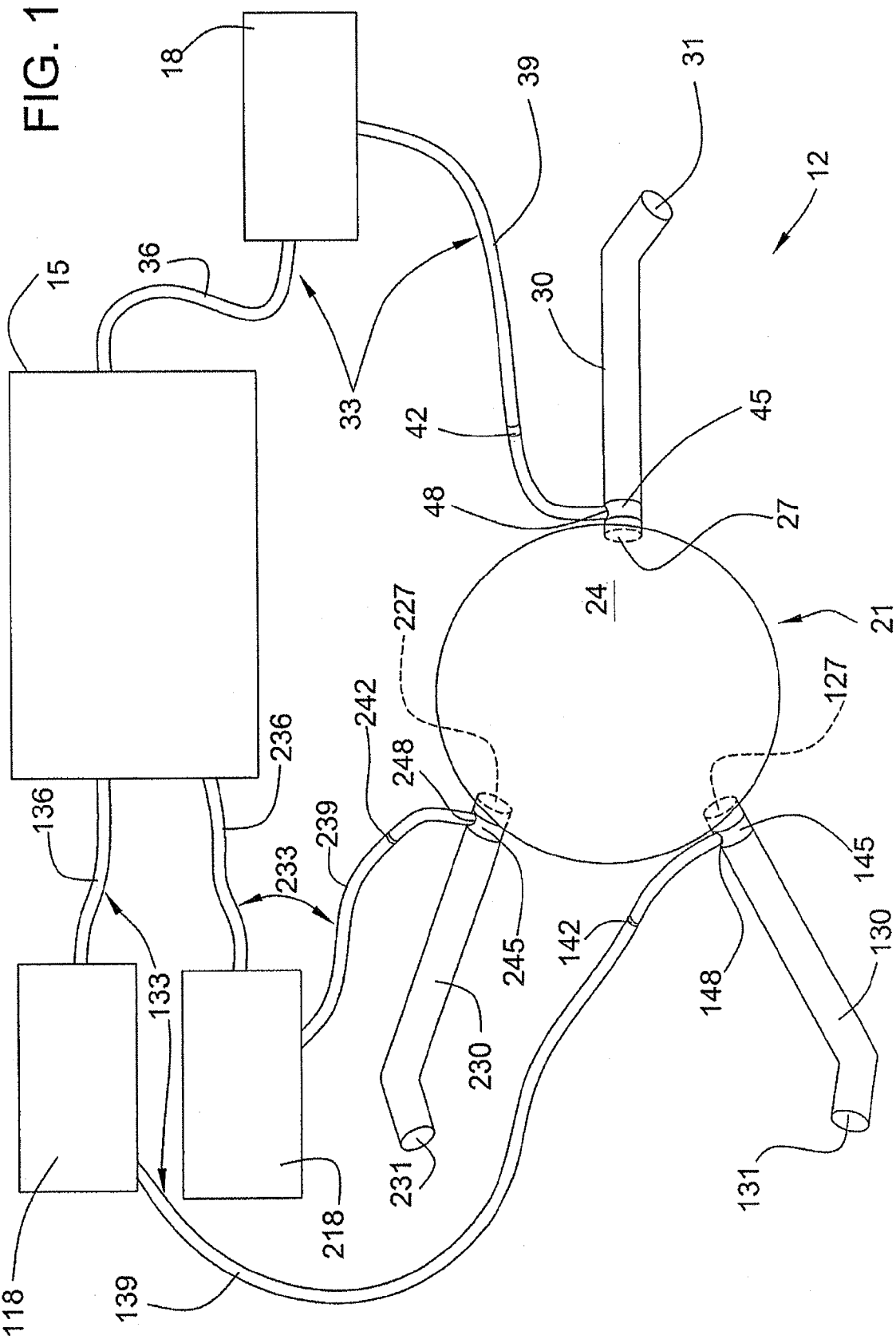
FIG. 1 shows a schematic plan view of a system for adding a high viscosity gypsum additive to a post-mixer aqueous dispersion of calcined gypsum.

While the invention is susceptible to various modifications and alternative constructions, certain illustrative embodiments thereof have been shown in the drawings and will be described below in detail. It should be understood, however, that there is no intention to limit the invention to the specific embodiments disclosed, but on the contrary, the intention is to cover all modifications, alternative constructions, and equivalents falling within the spirit and scope of the invention as defined by the appended claims.

DETAILED DESCRIPTION OF THE INVENTION

The present invention is premised, at least in part, on the surprising discovery that a high viscosity production additive such as wet gypsum accelerator can be added to a relatively low viscosity aqueous dispersion calcined gypsum in a discharge apparatus downstream of a stucco mixer, and still achieve adequate mixing to yield a gypsum product with acceptable set time. Advantageously, the discharge apparatus according to the invention does not require a separate power source in order to mix the high viscosity production additive with the aqueous dispersion of calcined gypsum as the dispersion passes from the stucco mixer through the discharge apparatus.

According to one aspect of the invention, a system 12 for adding a high viscosity production additive to a post-mixer aqueous dispersion of calcined gypsum is provided. The system 12 comprises a high viscosity production additive source 15, which in some embodiments can hold wet gypsum accelerator (WGA). While a single source 15 is shown that is for illustrative purposes only as multiple sources can be provided. The system 12 also comprises a delivery device 18, which can comprise a pump, and in some embodiments is a positive displacement pump. Appropriate pumps for use in the systems of the invention are discussed in more detail in relation to the methods of the invention. The system 12 further comprises a mixer 21 for producing an aqueous dispersion of calcined gypsum. The mixer 21 has an interior or mixing chamber 24 from which is provided at least one outlet 27. Extending from the mixer outlet 27 is a discharge apparatus 30 through which the aqueous gypsum slurry can flow and ultimately exit at an outlet 31. In some embodiments, the outlet comprises a boot. A boot is appropriate for use on the discharge apparatus used for depositing the main field slurry—as opposed to the densified layer slurry. In other embodiments, the outlet is provided as a conduit such as hose. A conduit or hose outlet is appropriate for a densified layer discharge apparatus.

Figure 2:
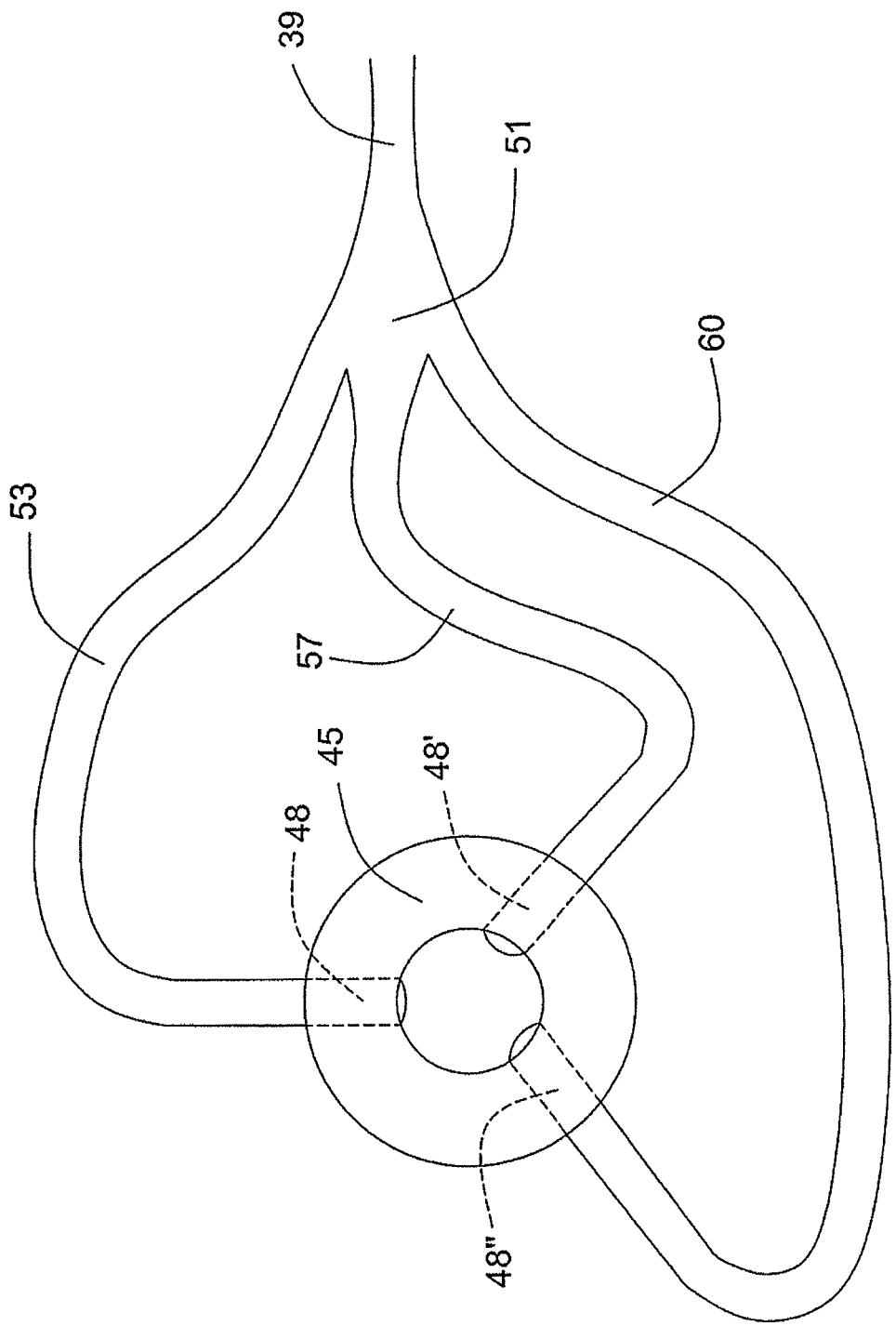
FIG. 2 shows a schematic cross-sectional view of part of the system shown in FIG. 1 comprising an injection ring with multiple injection ports.
Figure 3:
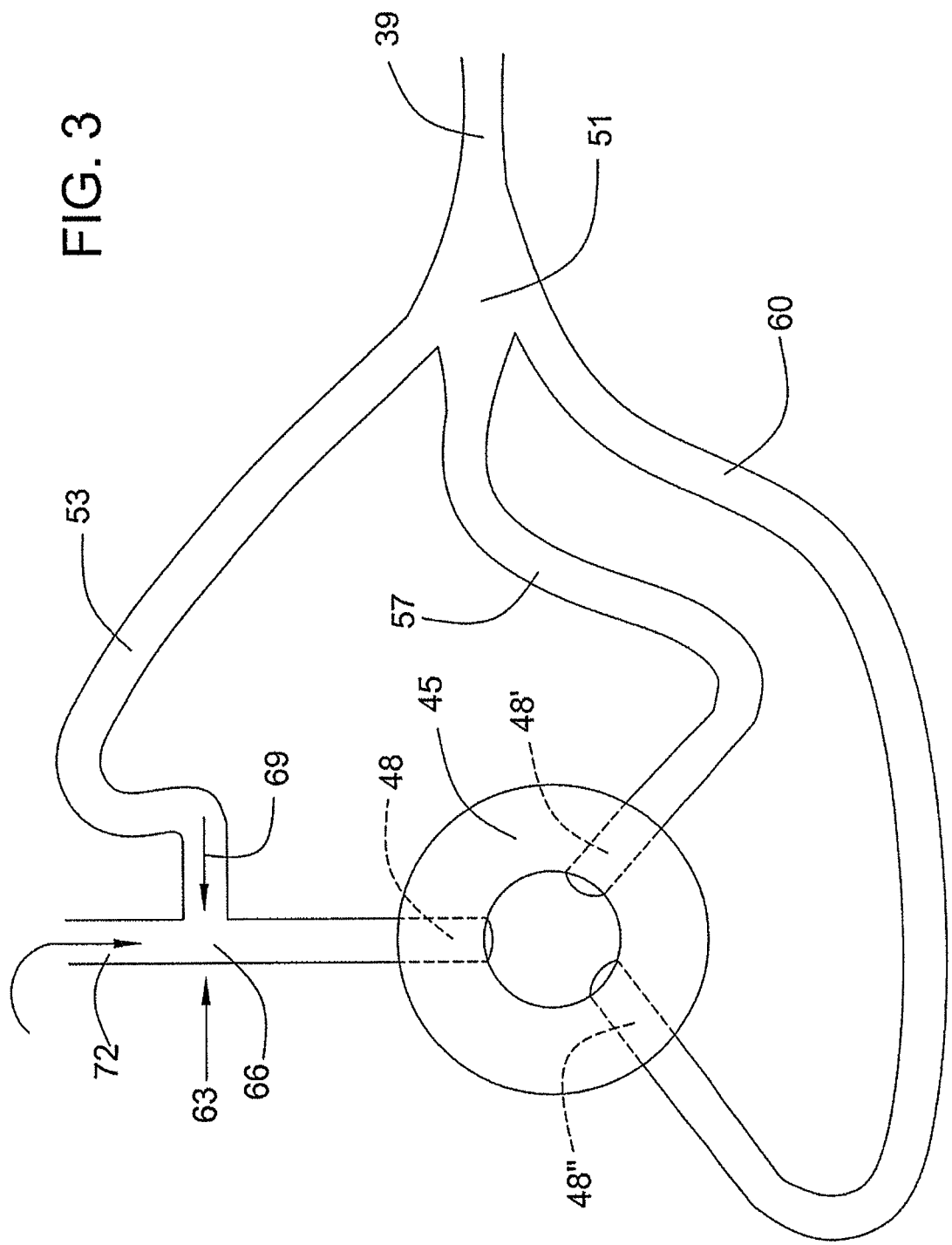
FIG. 3 shows a variation on the schematic cross-sectional view of FIG. 2 incorporating a tee junction.

The source 15, delivery device 18, and discharge apparatus 30 are operatively connected so as to permit flow of WGA and/or other production additive. In some embodiments, the connectivity is provided by a transfer line 33, which in turn can have multiple segments, for example, 36, 39, depending on the embodiment. The transfer line 33 can have a pressure meter 42 for use in measuring the pressure of the production additive in the transfer line. The transfer line 33 is associated with an injection ring 45. The injection ring 45 comprises at least one injection port 48 through which the transfer line 33 can feed. More detailed views of the injection ring and associated elements are shown in FIGS. 2 and 3. While injection rings are discussed in the context of both systems and methods of the present invention, other means of injection can be employed in addition or in the alternative to an injection ring. For example, in some embodiments, a needle on a transfer line can be used for transfer into the discharge apparatus. In some embodiments, a nipple is provided in the discharge apparatus to allow transfer into the apparatus.

The system 12 can further incorporate one or more additional discharge apparatus, for example, 130 and 230. Such additional discharge apparatuses, for example, 130 and 230, can be operatively associated with various elements in a manner analogous to that described for the discharge apparatus 30. Delivery devices 118, 218, mixer outlets, 127, 227, discharge apparatus outlets, 131, 231, transfer lines 133, in some embodiments including 136 and 139, 233, in some embodiments including 236 and 239, pressure gauges 142, 242, injection rings 145, 245, injection ports 148, 248, are operatively associated in a manner analogous to those described for the discharge apparatus 30 and associated elements. While FIG. 1, shows a system 12 with three discharge apparatuses 30, 130, and 230, and associated elements, the system 12 can have as few as one discharge apparatus 30 with no upper limit contemplated on the number of additional apparatuses.

FIG. 2 shows an embodiment in which the transfer line 33 comprises an udder, manifold, or other device with branching capability 51 that splits the transfer line 33 into a plurality of branch lines 53, 57, and 60. Three branch lines are shown for illustrative purposes only. The injection ring 45 of FIG. 2 is shown with a plurality of injection ports 48, 48', and 48", the injection ring 45, but again that number is shown for illustrative purposes only. The branch lines 53, 57, and 60 feed into injection ports 48, 48', and 48" respectively. In some embodiments, additional injection rings, for example, 145, 245, as depicted in FIG. 1, can be present and incorporate the aforementioned features.

FIG. 3 shows a variation on the embodiment shown in FIG. 2, which incorporates a tee 63 that allows mixing of the production additive from the source 15 with one or more additional production additives of no particular viscosity prior to injection into the discharge apparatus 30. The tee 63 comprises a junction 66 on which a first additive 69 and a second additive 72 converge. While FIG. 3 only shows a tee 63 for one of the injection ports 48, that representation is for illustrative purposes only. Any number of the injection ports can have a tee 63 associated with them.

Figure 4:
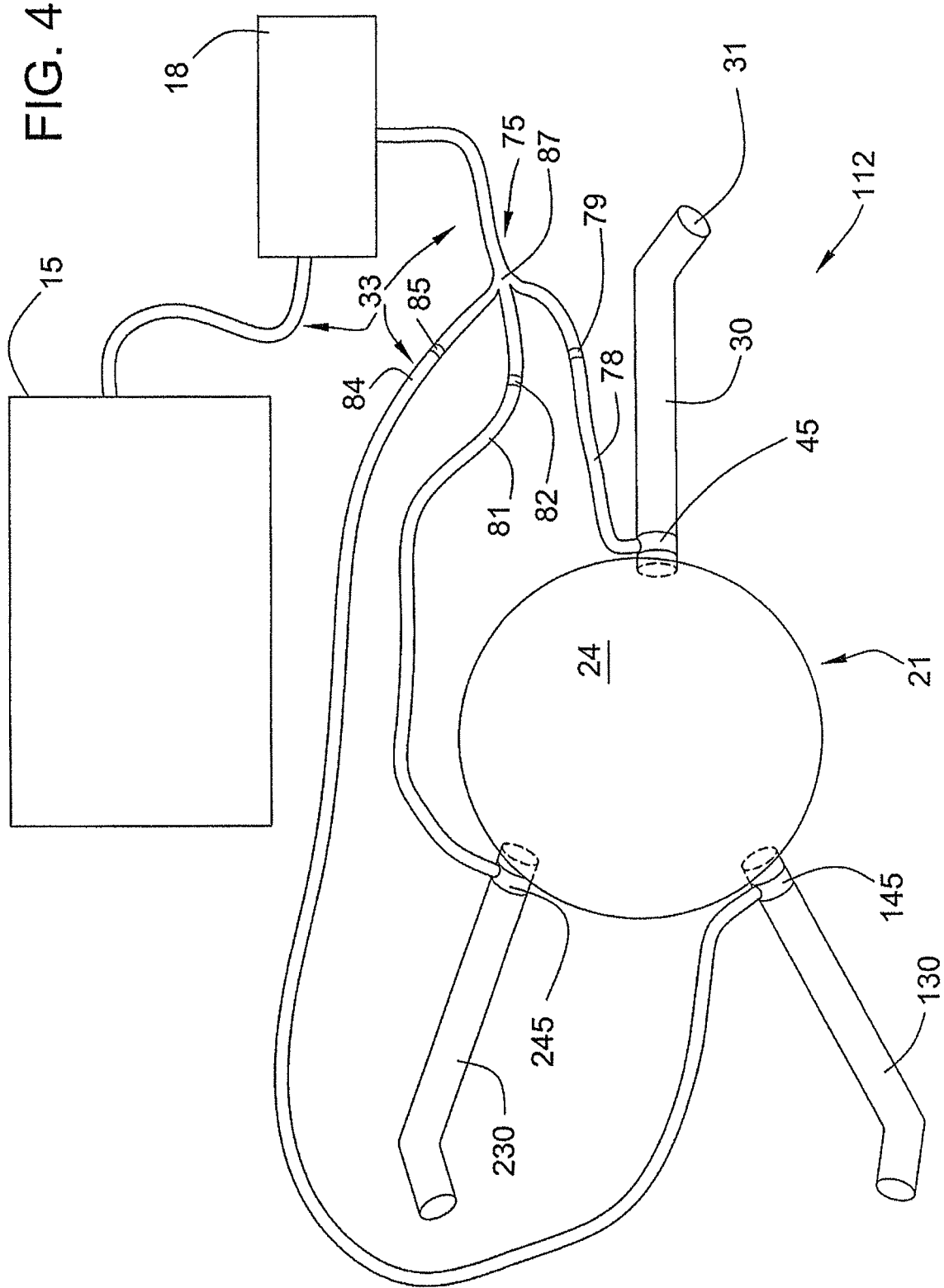
FIG. 4 shows a schematic plan view of a variation on the system shown in FIG. 1.
Figure 5:
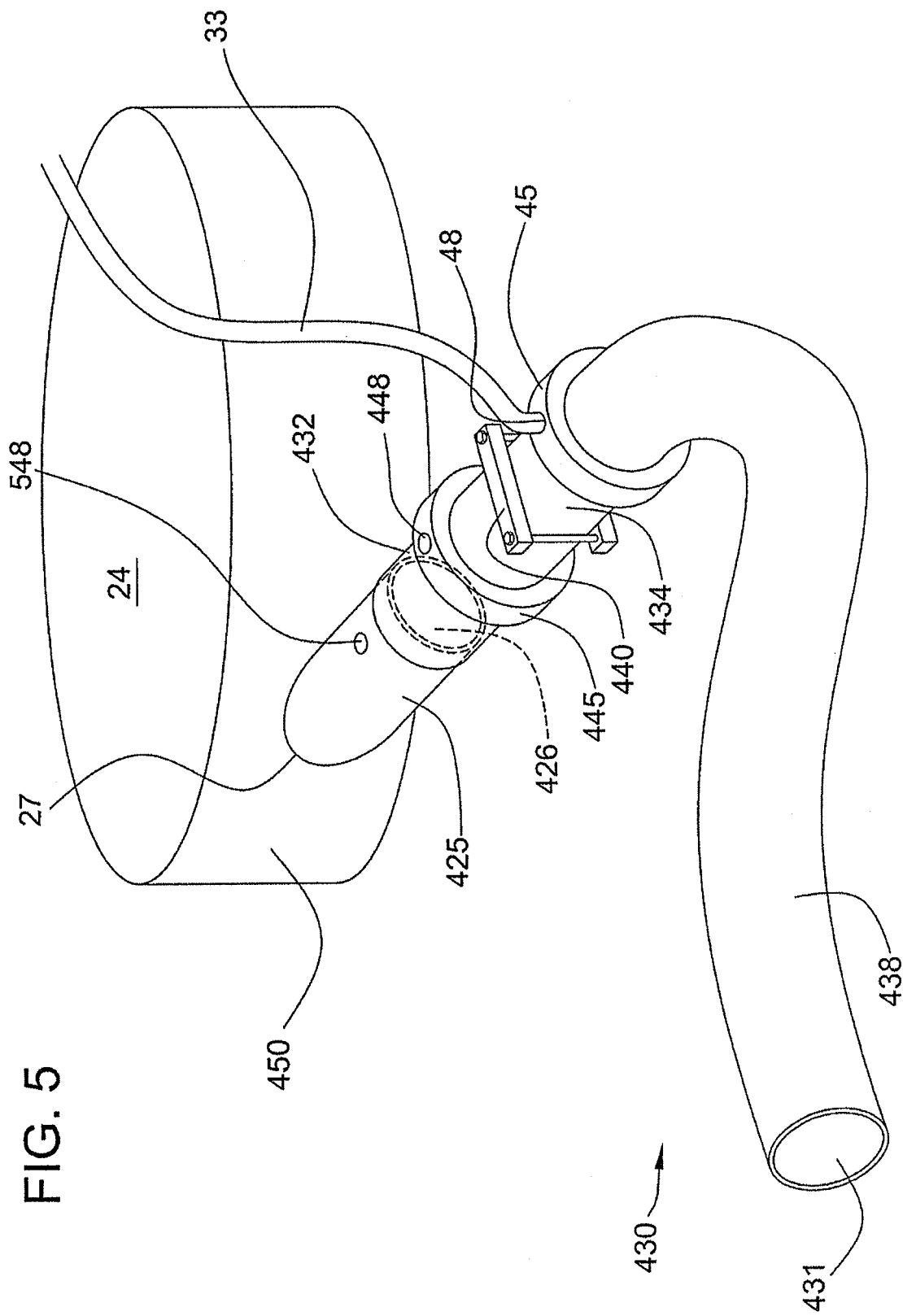
FIG. 5 shows a partial perspective view of a mixer and discharge apparatus.

FIG. 4 shows a system 112, which is a variation on that shown in FIG. 5. System 112 again comprises a production additive source 15 from which a high viscosity production additive, for example, WGA, is fed to the respective discharge apparatuses 30, 130, and 230. Unlike that system 12, the system 112 uses a single delivery device 18, for example, a pump, and a udder, manifold, or other device with branching capability 75 to split the transfer line 33 into multiple branch lines, for example, 78, 81, and 84, dividing from each other at 87. The branch lines, for example, 78, 81, and 84, can incorporate valves or similar devices 79, 82, and 85 to control flow to the branch lines, and such valves can also or in the alternative be associated with the branching device 75. Each branch line eventually leads to an injection ring 45, 145, and 245 on the respective discharge apparatuses 30, 130, and 230. In some embodiments, there is a delivery device 18 that assists in transfer of additive from the source 15 to the discharge apparatus 30 and a second delivery device 118 that assists in transfer of the additive from the source 15 to both the second and third discharge apparatuses 130, 230 using an udder, manifold, or other device with branching capability 75 with at least two branches, 81, 84, without a third delivery device 218. The number of branch lines and other elements is shown for illustrative purposes only and other numbers are possible as well. In still other embodiments, each discharge apparatus has its own source.

FIG. 5 shows a discharge apparatus 430, which is one embodiment for the discharge apparatus 30, 130, 230, etc. The discharge apparatus 430 also displays a number of different elements and attributes that can be comprised by and/or operatively associated with a discharge apparatus generally. The discharge apparatus comprises a gate 425 with gate opening 426, a series of hose sections 432, 434 and 438, a cage valve 440, and two injection rings 45, 445 with injection ports 48, 448, and an outlet 431. The gate 425 acts as an adapter that allows the discharge apparatus' conduit to attach to the mixer 21 at the mixer outlet 27. The gate 425 is shown with an optional injection port 548. The injection ports 48, 448, and 548 are examples of possible locations for entry of WGA, foam, or other production additive. The rings 45, 445 and gate 425 can be configured to have multiple injection ports, for example, as illustrated in FIGS. 2 and 3. In some embodiments, the hose section 434 separating the rings 45, 445 is about 15 to about 16 inches long. The transfer line 33 or other transfer lines can be connected at any of the injection ports. The positioning of the cage valve 440 can be varied along the length of the discharge conduit 430 and can allow for control of flow in the discharge conduit. Multiple cage valves and/or other valve types can also be employed. The discharge apparatuses and systems of the invention can incorporate elements or subsystems described in co-owned U.S. Pat. No. 6,494,609.

Additional systems of the invention are described herein in regards to the below examples. While those systems are discussed in the context of the examples, they are not limited to the uses described in those examples.

The methods of the present invention can utilize one or more systems, subsystems, and elements as described herein, for example, as described in respect to the figures. However, the methods can employ other appropriate systems, subsystems, and elements. While the methods are described in relation to various systems, subsystems, and elements, such description is provided to assist the reader in appreciating the invention, and not to limit the invention as set forth in the appended claims. The methods described herein are described in terms of WGA addition to an aqueous dispersion of calcined gypsum, but that is for illustrative purposes only. Other additives with high viscosities similar to that of WGA or other appropriate viscosities described herein can also be used. Moreover, one or more additional accelerators can be used. Examples of such accelerators include potash, heat resistant accelerator (HRA), climate stabilized accelerator (CSA), and any accelerator known in the gypsum art. In those embodiments where one or more additional accelerators are employed, the additional accelerant can be added in the aqueous dispersion of calcined gypsum mixer or outside of that mixer, that is, in the discharge apparatus. In some embodiments, potash, in granule and/or powder form, is used as an additional accelerator.

Wet gypsum accelerator (WGA) and/or other high viscosity additives, for example, starch solutions, can be used according the methods of the present invention. A high viscosity additive can comprise one or more additional additives that by themselves can have a low viscosity, provided that when combined with the high viscosity additive the viscosity of the high viscosity additive remains high. WGA and other high viscosity additives of the invention typically have a viscosity in the range of between about 3000 to about 5000 centipoises. In some embodiments, the range will be between about 2000 to about 10000 centipoises. In some embodiments, the range will be between about 2500 to about 9500 centipoises. In some embodiments, the range will be between about 3000 to about 9000 centipoises. In some embodiments, the range will be between about 3500 about to about 8500 centipoises. In some embodiments, the range will be between about 4000 to about 8000 centipoises. In some embodiments, the range will be between about 4500 to about 7500 centipoises. In some embodiments, the range will be between about 5000 to about 7000 centipoises. In some embodiments, the range will be between about 5500 to about 6500 centipoises. In some embodiments, the range will be between about 2500 to about 5500 centipoises. In some embodiments, the range will be between about 2750 to about 5250 centipoises. In some embodiments, the range will be between about 3250 to about 4750 centipoises. In some embodiments, the range will be between about 3500 to about 4500 centipoises. In some embodiments, the range will be from about 3750 to about 4250 centipoises. In some embodiments, the viscosity of the wet gypsum accelerator is about 1000 centipoises or greater and about 5000 centipoises or less. In some embodiments, the viscosity of the wet gypsum accelerator is about 2000 centipoises to about 4000 centipoises. Viscosity measurements described herein are reflective of measurements taken at ambient temperatures. Representative WGA for use in the present invention is described in U.S. Pat. No. 6,409,825, as well as in U.S. Pat. No. 7,718,019. The viscosity of the high viscosity additive used can be limited by the constraints of the system employed, for example, whether the pump employed is powerful enough to allow delivery of the additive to the discharge apparatus. One of skill in the gypsum art will be able to identify the appropriate type of WGA for a given gypsum application based on the teachings of the present invention and the knowledge available in the art.

One aspect of the invention provides a method of introducing a wet gypsum accelerator (WGA) to a post-mixer aqueous dispersion of calcined gypsum, in which the method comprises forming an aqueous dispersion of calcined gypsum in a mixer chamber; transferring the aqueous dispersion into a discharge apparatus; and introducing the WGA into the aqueous dispersion within the discharge apparatus. In some embodiments, the WGA comprises calcium sulfate dihydrate, water, and at least one phosphorous additive selected from the group consisting of: (a) an organic phosphonic compound; (b) a phosphate-containing compound; and (c) a mixture of (a) and (b). In some embodiments, the ground product of the WGA comprises calcium sulfate dihydrate and has a median particle size of about 5 μm or less. The ground product is the result of the wet grinding used to produce WGA. This process is discussed in co-owned U.S. Pat. No. 6,409,825, and U.S. Pat. No. 7,718,019. In some embodiments, the ground product of the WGA has a median particle size of about 0.5 μm to about 2 μm. In some embodiments, the ground product of the WGA has a median particle size of about 1 μm to about 1.7 μm. In some embodiments, the ground product of the WGA has a median particle size of about 1 μm to about 1.5 μm.

In some embodiments, the phosphorous additive is present in an amount of about 0.1% to about 10% by weight of said accelerator. In some embodiments, the ground product of the WGA is substantially amorphous. In some embodiments, the phosphorous additive is a mixture of at least one organic phosphonic compound and at least one phosphate-containing compound, wherein the organic phosphonic compound is present in an amount of from about 0.05% to about 9.95% by weight of said accelerator, and wherein the phosphate-containing compound is present in an amount of from about 0.05% to about 9.95% by weight of said accelerator.

In some embodiments, the WGA comprises an organic phosphonic compound selected from the group consisting of aminotri(methylene-phosphonic acid), aminotri(methylene-phosphonic acid), 1-hydroxyethylidene-1,1-diphosphonic acid, 1-hydroxyethylidene-1,1-diphosphonic acid, diethylenetriamine penta(methylene phosphonic acid), diethylenetriamine penta(methylene phosphonic acid), hexamethylene diamine tetra(methylene phosphonic acid), hexamethylene diamine tetra(methylene phosphonic acid), a pentasodium salt, trisodium salt, tetrasodium salt, sodium salt, ammonium salt, potassium salt, calcium salt, or magnesium salt of any of the foregoing acids, and combinations thereof.

In some embodiments, the WGA comprises a phosphate-containing compound selected from the group consisting of orthophosphates, polyphosphates, and combinations thereof. In some embodiments, the WGA comprises a phosphate-containing compound selected from the group consisting of tetrapotassium pyrophosphate, sodium acid pyrophosphate, sodium tripolyphosphate, tetrasodium pyrophosphate, sodium potassium tripolyphosphate, sodium hexametaphosphate salt having from 6 to about 27 phosphate units, ammonium polyphosphate, sodium trimetaphosphate, and combinations thereof.

It will be appreciated by those skilled in the art that the present invention can be practiced in a variety of ways without departing from the spirit of the invention. For example, in some embodiments, the WGA comprises a mixture of about 0.5% pentasodium salt of aminotri(methylene phosphonic acid) by weight of the calcium gypsum dihydrate and about 0.5% sodium trimetaphosphate by weight of the calcium gypsum dihydrate. The solids content of the WGA can be modified, as desired, depending on the particular application. Similarly, the viscosity of the WGA can be modified, depending on the particular application. Thus, as will be appreciated by those skilled in the art, if the viscosity or the solids content of the WGA is undesirably high for the intended application, the WGA can be diluted with water before it is used. By way of illustration and not in limitation of the invention, in some embodiments, the WGA comprises a solids content comprising calcium sulfate dihydrate in an amount of at least about 20% by weight of said accelerator. In some embodiments, the solids portion comprising calcium sulfate dihydrate of the accelerator is present in an amount of from 35% to about 45% of said accelerator, and water is present in an amount of from about 55% to about 65% by weight of said accelerator. The versatility of the WGA of the present invention will also be understood by those skilled in the art. For example, in some embodiments, when added to a mixture comprising calcined gypsum and water used to form an interlocking matrix of set gypsum, the WGA of the present invention allows for a Time to 50% Hydration of calcined gypsum of about 6 minutes or less. In some embodiments, when added to a mixture comprising calcined gypsum and water used to form an interlocking matrix of set gypsum, the WGA allows for a Time to 50% Hydration of calcined gypsum of about 5 minutes or less. Desired setting times can depend upon various factors, including the solids content of the WGA, the viscosity of the WGA, and the particle size of the solids of the WGA. When the WGA is used in the manufacture of gypsum board, other factors which can affect setting times include line speed, length of the line, gypsum characteristics and the like, as will be appreciated by one of ordinary skill in the art.

The WGA and/or other high viscosity additive is introduced into the relatively low viscosity aqueous dispersion of calcined gypsum contained with the discharge apparatus 30. In some embodiments, the aqueous dispersion has a viscosity of between about 700 to about 1200 centipoises. In some embodiments, the dispersion has a viscosity of between about 100 to 1750 centipoises. In some embodiments, the dispersion has a viscosity of between about 200 to 1650 centipoises. In some embodiments, the dispersion has a viscosity of between about 300 to 1550 centipoises. In some embodiments, the dispersion has a viscosity of between about 400 to 1500 centipoises. In some embodiments, the dispersion has a viscosity of between about 450 to 1450 centipoises. In some embodiments, the dispersion has a viscosity of between about 500 to 1400 centipoises. In some embodiments, the dispersion has a viscosity of between about 550 to 1350 centipoises. In some embodiments, the dispersion has a viscosity of between about 600 to 1300 centipoises. In some embodiments, the dispersion has a viscosity of between about 650 to 1250 centipoises. In some embodiments, the dispersion has a viscosity of between about 750 to 1150 centipoises. In some embodiments, the dispersion has a viscosity of between about 800 to 1000 centipoises. In some embodiments, the dispersion has a viscosity of between about 850 to 950 centipoises.

In some embodiments, the dispersion has a viscosity of between about 875 to 925 centipoises. The WGA and/or other high viscosity production additive to be introduced into the aqueous dispersion of calcined gypsum in the discharge apparatus according to the present invention can also be expressed in terms of a ratio. For example, the WGA can have a viscosity approximately four times that of the aqueous dispersion. In some embodiments, the WGA has a viscosity approximately three times that of the aqueous dispersion. Applicable ratios include 10:1, 9:1, 8:1, 7:1, 6:1, 5:1, 4.5:1, 4.25:1, 4.1, 3.75:1, and 3.5:1, 3.25:1, 3:1, 2.75:1, 2.5:1, 2.25:1, 2:1, as well as ratios intermediate to said ratios.

A method in accordance with the present invention comprises delivering a high viscosity production additive such as WGA from a source 15 to a discharge apparatus 30 where the additive is introduced into an aqueous dispersion of calcined gypsum that has been discharged from a gypsum mixer, for example, a pin mixer, multipass mixer, pinless mixer, or other mixers that can be used to make aqueous gypsum dispersions wherein the aqueous dispersion had been mixed. While gravity transfer is contemplated, the WGA is generally moved from the source 15 to the discharge apparatus 30 with the assistance of one or more delivery devices, for example, 18, 118, 218. In some embodiments, the delivery device is a pump. In some embodiments, the pump is a positive displacement pump, but other pump types can be used in addition or in the alternative, for example, a centrifugal pump. Examples of suitable positive displacement pumps include progressive cavity, gear, and peristaltic pumps. The pressure of the slurry entering the discharge apparatus should be maintained at a pressure greater than that of the contents of the discharge apparatus so as to minimize back pressure and allow efficient transfer of the HRA slurry. In some embodiments, the pressure in the discharge apparatus is between about 5 and about 15 p.s.i. The pressure of the WGA in the transfer line 33 between the source 15 and discharge apparatus 30 can be measured using a pressure gauge 42. However, use of such a gauge is not necessary if the pump employed is self-regulating. In some embodiments, the gauge has a range of 0-30 p.s.i.

The WGA can be discharged into the discharge apparatus 30 through an injection port 48, which can be associated with an injection ring 45. In some embodiments, the WGA is split into multiple branches to allow for multiple entries into the discharge apparatus 30. Such multiple entries can be achieved by providing multiple inlets, for example, 48, 48', and 48'' in the injection ring 45. In some embodiments, the WGA is combined with one or more additional additives, for example, foam, before being introduced into the aqueous dispersion of the discharge apparatus 30. Such combining can be accomplished using a tee 63 formed by entry of WGA or other high viscosity additive 69 and another additive irrespective of viscosity 72. In some embodiments, the WGA and one or more additional additives are combined approximately three inches from the point of injection into the discharge apparatus. In some embodiments, the WGA is transferred into the discharge apparatus downstream of a pinch valve operatively associated with the discharge apparatus.

For a particular gypsum product, multiple discharge apparatuses can be implemented. For example, if the intended product is wallboard and top and bottom densified layers are desired, second and third discharge apparatuses, that is, densified layer extractors) 130, 230 can be provided. For certain wallboard products as well other board products such as ceiling tile, see co-owned, co-pending U.S. patent application Ser. No. 10/804,359, only a single densified layer is applied. In some embodiments a separate delivery devices 18, 118, and 218 are utilized for transfer of the WGA from the source 15 to the discharge apparatuses 30, 130, and 230. In other embodiments, there is a single delivery device 30 for transfer of the WGA to all three discharge apparatuses. In still other embodiments, a delivery device 18 is used for the discharge apparatus 30, and a delivery device 118 is used for the discharge apparatuses 130 and 230. Regardless of the number or presence of delivery devices, the WGA can split into branch transfer lines using an udder, tee, manifold, or other device allowing branching of the transfer line. Control of WGA flow into particular branch lines can be controlled using a valve or other element of like function.

WGA and/or other high density production additive is generally introduced to the post-mixer aqueous dispersion in a stream perpendicular to the flow of the dispersion in the discharge apparatus. However, other orientations of WGA introduction are also possible. For ideal incorporation into the aqueous dispersion, the WGA is introduced into the discharge apparatus closer to the mixer outlet 27 than the discharge outlet 31. In some embodiments, the introduction occurs from about 2.5 inches to 3 inches from the mixer outlet 27. In some embodiments, the introduction occurs about 1 inch from the mixer outlet. Generally, moving the introduction of the WGA downstream in the discharge apparatus will serve to delay setting acceleration.

When using the present methods to make a wallboard product with first, for example, bottom, and second, for example, top, densified layer layers, each densified layer discharge apparatus 130, 230 can comprise and/or be operatively associated with one or more of the following: a hose and a ring (for example, 145, 245). The percentage of WGA to provide a proper set is dependent on the amount of aqueous slurry that is being applied to the densified layer of the board. For example, if 10% of the main gypsum slurry, the aqueous dispersion from the mixer 21, is being applied to a first, for example, bottom, densified layer, then preferably approximately 10% of the WGA is directed to the bottom densified layer through the bottom discharge apparatus 130. If a second, for example, top, densified layer is being utilized, the proportion of WGA would again preferably approximately match the percentage of gypsum slurry being applied to the top densified layer. Percentages of gypsum slurry from the mixer 21 generally range from about 5% to about 20%. The terms top and bottom, as well as face and back and other equivalent terms, are relative terms in respect to which orientation of the gypsum product one is referring to. For purposes of illustration only, bottom refers to a first paper, that is, a cover sheet, that travels beneath the gypsum mixer and the densified layer that is applied to that first paper. Top refers to a second paper that is applied after addition of the gypsum slurry through the main discharge apparatus 30 to the bottom paper, as well as the densified layer applied to the second paper. In some embodiments, a dispersant is added to the discharge apparatus such as lignin, napthelene sulfate or other suitable dispersant.

The systems and method of the present invention have the benefit of delaying setting of an aqueous dispersion of calcined gypsum by delaying the introduction of WGA until after the dispersion has left the stucco mixer 21. In some embodiments, the methods allow for addition of less water to the stucco mixer resulting in a lower water-stucco ratio, as a result of less setting in the mixer because of the absence of accelerator in the mixer interior 24. Methods and systems are also contemplated for introducing the WGA directly into the mixer 21 in addition to introduction into the discharge apparatus.

The following examples further illustrate the invention but, of course, should not be construed as in any way limiting its scope.

EXAMPLE 1

Addition of WGA to the Discharge Apparatus

This example demonstrates that WGA can be added in the discharge apparatus to achieve a desirable gypsum product. WGA used for the trial was of the following formulation: 0.5% pentasodium salt and 0.5% sodium trimetaphosphate, and 42% solids by weight of the WGA and 58% water by weight of the WGA. A trial was performed in which WGA was introduced in the main gate of the main discharge apparatus and the back densified layer discharge apparatus. As a comparison, the WGA was also injected into an emergency water port inside the pin mixer. The WGA successfully set the board uniformly when added inside or "outside" the mixer. WGA usage did not change whether it was being introduced inside or outside the mixer. In both of these cases, no heat resistant accelerator (HRA) was being added to set the board, although HRA was used during an initial start-up period. HRA used during the trial was a mixture of 99.5% gypsum/ 0.5% sugar milled to fine particle size in a dry condition. Typical gypsum board paper was employed for the trial. Table 1 summarizes the trial conditions and records the accelerator usage (HRA and WGA) and water usage Units in Table 1, where applicable, are in lbs/MSF. The stucco used in the trial was 1235 lbs./MSF. THE WGA % solid was 42%.

TABLE 1

Trial Parameters [All UNITS IN LBS./MSF]

| Time | Condition | HRA | Field Layer WGA | Densified Layer WGA | Dispersant | Mixer Water | Foam Water | WGA Water | Total Water |
|---|---|---|---|---|---|---|---|---|---|
| 14:32 | Startup After Down Day WGA Added Outside Mixer | 10.0 | 35.0 | 3.5 | 5.0 | 764.0 | 96.0 | 22.3 | 882.3 |
| 14:53 | Reduce HRA, Increase WGA | 3.0 | 40.0 | 4.0 | 5.0 | 736.0 | 123.0 | 25.5 | 884.5 |
| 15:01 | Reduce HRA, Increase WGA | 1.5 | 45.0 | 4.5 | 5.0 | 738.0 | 123.0 | 28.7 | 889.7 |
| 15:06 | Reduce HRA, Increase WGA | 1.5 | 55.0 | 5.5 | 5.0 | 736.0 | 123.0 | 35.1 | 894.1 |
| 15:11 | HRA All Out | — | 55.0 | 5.5 | 5.0 | 736.0 | 123.0 | 35.1 | 894.1 |
| 15:17 | Reduce Water | — | 55.0 | 5.5 | 5.0 | 721.0 | 123.0 | 35.1 | 879.1 |
| 15:25 | Reduce Water | — | 55.0 | 5.5 | 5.0 | 710.0 | 125.0 | 35.1 | 870.1 |
| 15:40 | Reduce WGA | — | 50.0 | 5.0 | 5.0 | 708.0 | 125.0 | 31.9 | 864.9 |

TABLE 1-continued

Trial Parameters [All UNITS IN LBS./MSF]

| Time | Condition | HRA | Field Layer WGA | Densified Layer WGA | Dispersant | Mixer Water | Foam Water | WGA Water | Total Water |
|---|---|---|---|---|---|---|---|---|---|
| 15:45 | Reduce Dispersant, including WGA | — | 55.0 | 5.0 | 3.5 | 706.0 | 125.0 | 34.8 | 865.8 |
| 16:10 | Reduce Foam Water | — | 55.0 | 5.0 | 3.0 | 708.0 | 105.0 | 34.8 | 847.8 |
| 16:16 | Switch WGA into Mixer | — | 60.0 | — | 3.0 | 707.0 | 105.0 | 34.8 | 846.8 |
| | Trial Stopped Short Afterward Due to Bottom Paper Break | | | | | | | | |
| 18:12 | HRA Only, Normal Production | 21.0 | — | — | 4.0 | 762.0 | 101.0 | — | 863.0 |

Figure 6:
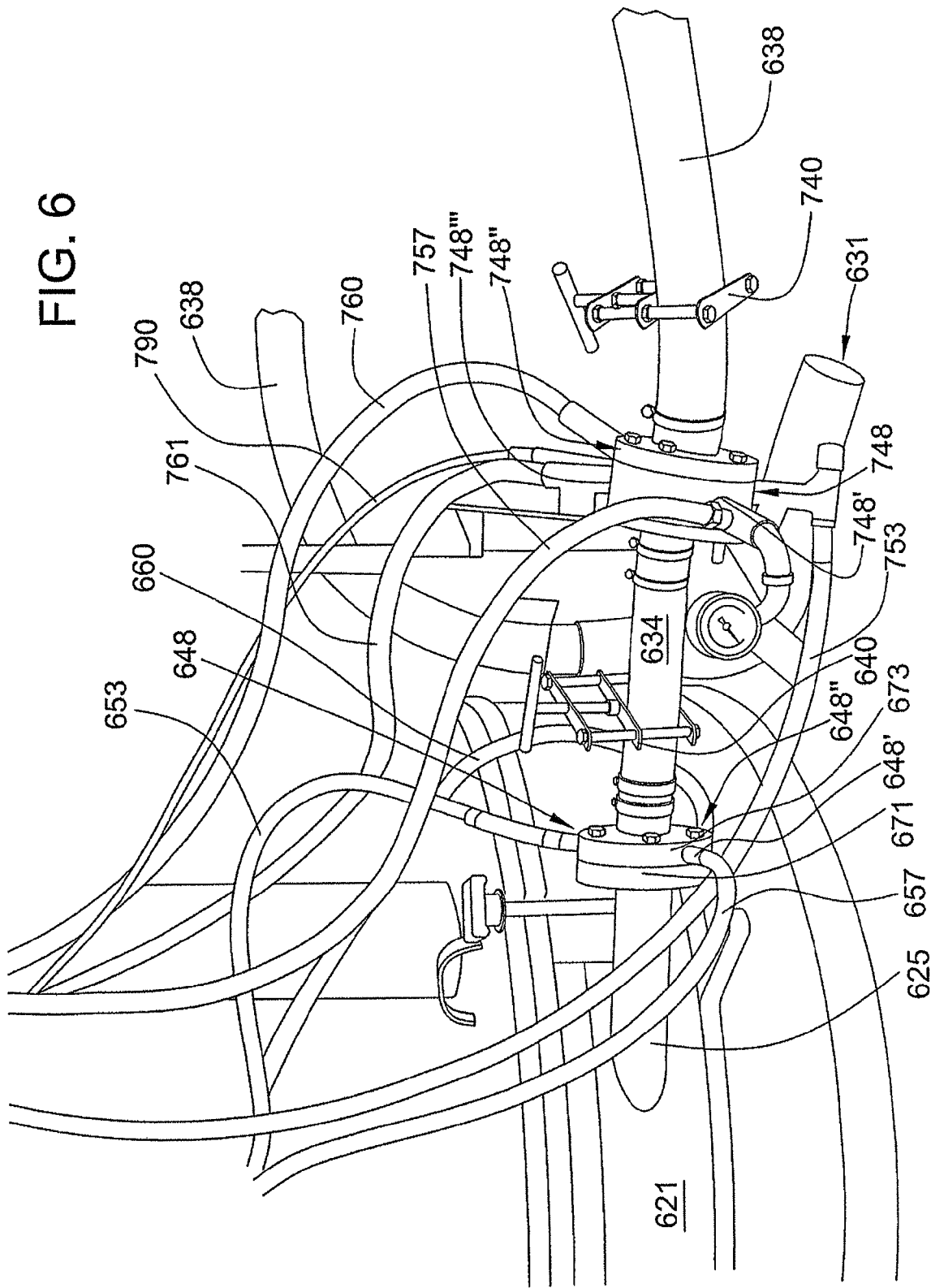
FIG. 6 shows a perspective view of a first portion of a mixer discharge apparatus system.
Figure 7:
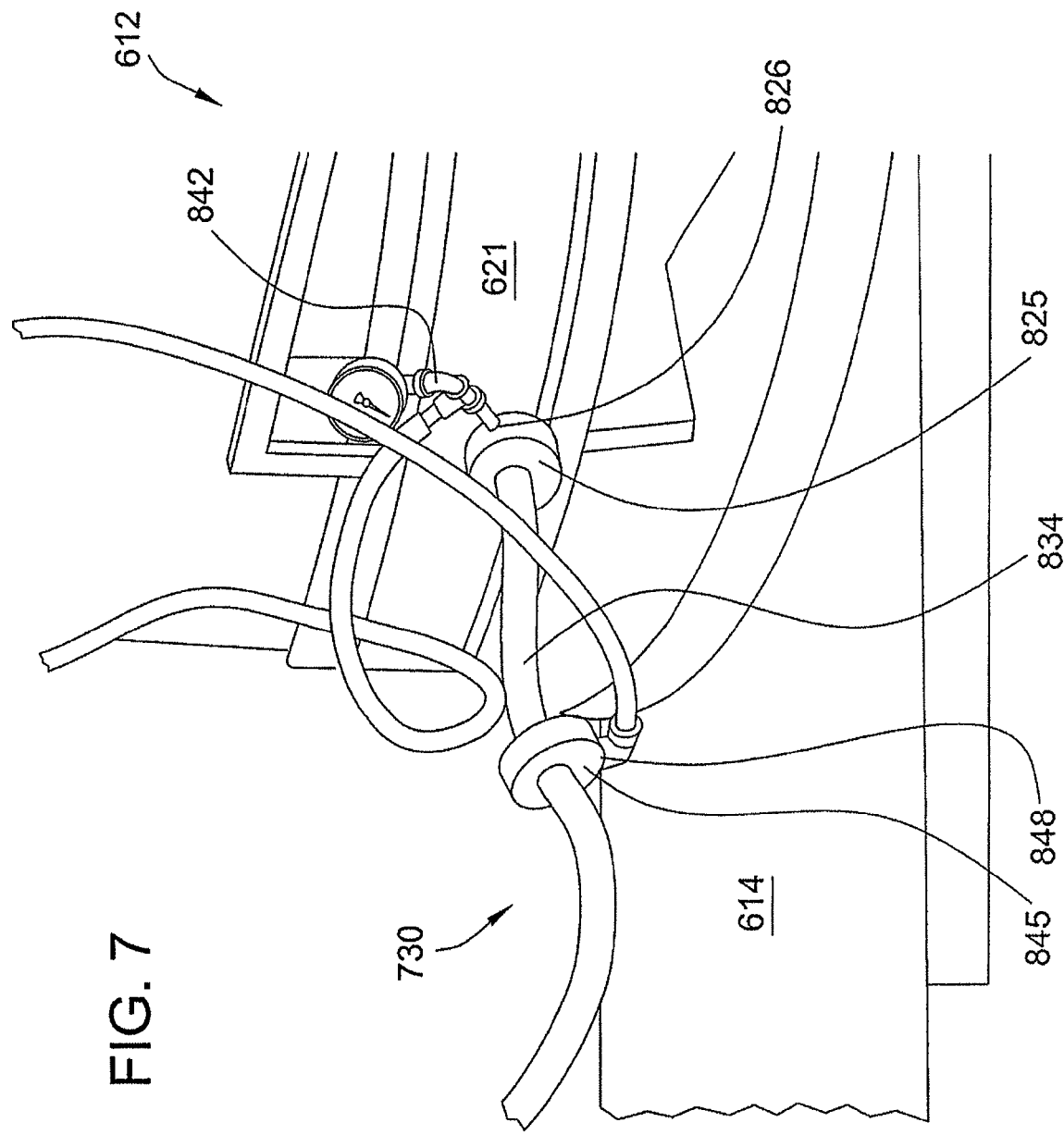
FIG. 7 shows a perspective view of a second portion of a mixer discharge apparatus system.
Figure 8:
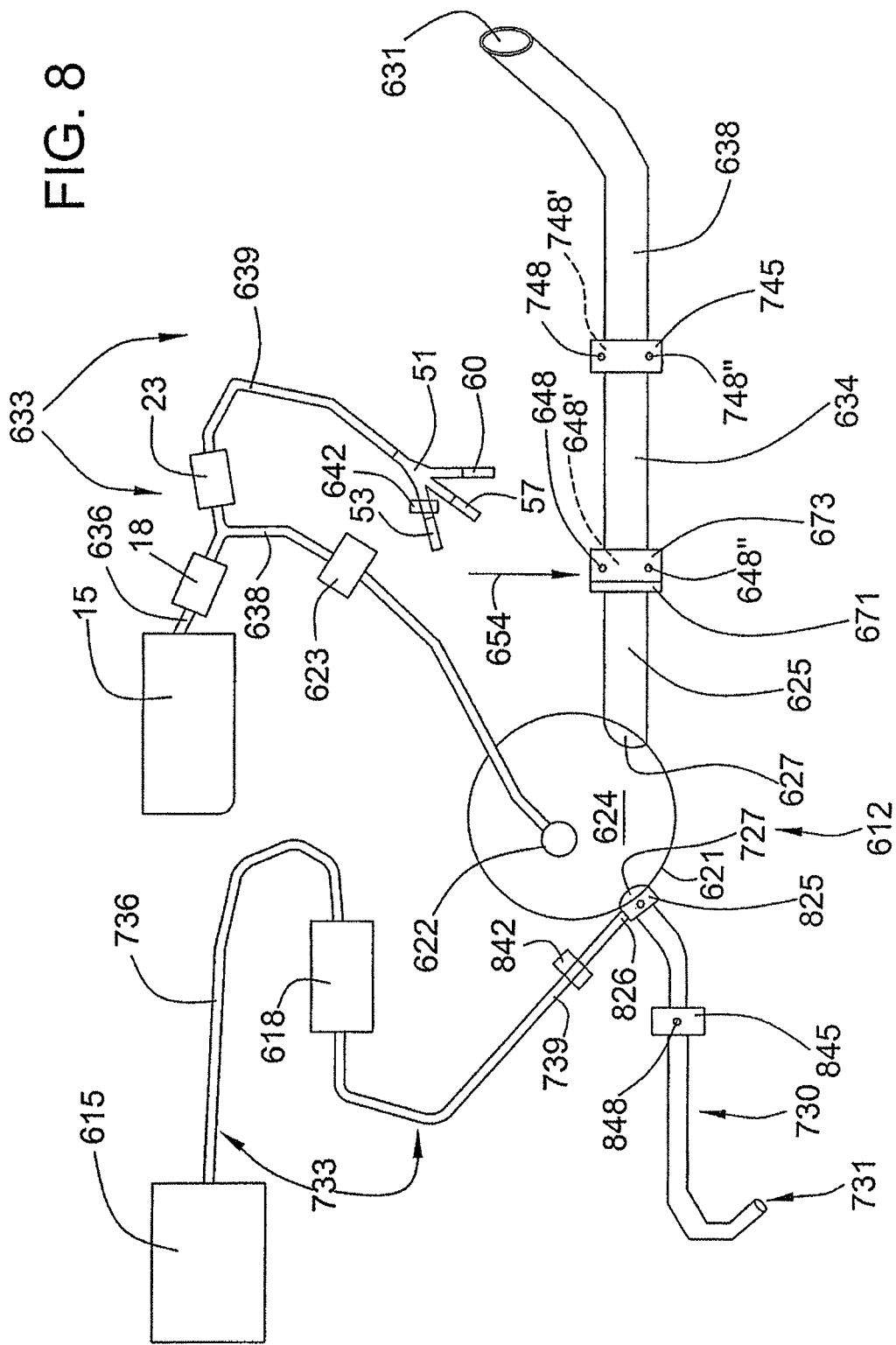
FIG. 8 shows a schematic plan view of the system depicted in FIGS. 6 and 7.

The system 612 schematically illustrated in FIGS. 6, 7, and 8 was used for the trial. Beneath the system is a first paper 614 to which the aqueous dispersion of calcined gypsum was applied. After the gypsum was applied to the paper 614, a second paper was applied to form wallboard. A densified layer was only applied to the bottom paper. In other embodiments, the densified layer can be applied to just the top paper, or to both top and bottom papers. The system 612 comprises a mixer 621 with an interior 624 and outlets 627, 727. Gates 625, 825 of discharge apparatuses 630, 730 were operatively associated with the outlets 627, 727. Accordingly, operatively associated with the mixer 621 was a main field discharge apparatus 630 and a densified layer discharge apparatus 730. Each discharge apparatus 630, 730, was supplied by separate WGA sources 15, 615 respectively. Separate transfer lines 633, including sections 636 and 639, 733, including 736 and 739, and pumps 18, 618 were used to transfer the WGA to the apparatuses 630, 730. The mixer 621 comprised an emergency water port 622 through which WGA was transferred during certain periods of the trial. The mixer 621 and discharge apparatus 630 were operatively associated with the WGA source 15 through branch transfer lines 638, 639 respectively. Control valves 23, 623, were provided on the branch transfer lines 638, 639 respectively to allow for control of WGA transfer to the mixer 621 and discharge apparatus 630.

The main mixer gate 625 is operatively associated with a first flange 671 and fitted against a second flange 673 operatively associated with a first hose section 634 of the discharge apparatus 630. WGA was supplied from the source 15 and transfer was assisted using a Moyno™ pump, which is a positive displacement pump. WGA was injected into a 1 and ¾" interior diameter (ID) flange 673 with three ⅜" ID ports 648, 648', and 648". The ports of flange 673 were supplied by three branch lines 653, 657, and 660 provided as three ½" hoses branching from an udder 51, in a manner analogous to what is shown in FIG. 2 for ring 45. While a pressure gauge 642, was not used during the trial, such a gauge can be supplied on one of the branch lines, for example, 53, just before injection into the flange 673. In some embodiments, a 0-30 p.s.i. gauge is employed. The arrow 654 indicates that the branch lines from the udder ultimately associate with the flange 673. In other embodiments, the 671, 673 flange set-up can be replaced with an analogous injection ring.

The foam ring 745 included ports 748, 748', 748", and 748''' supplied with foam from a foam source using foam transfer lines one of which was supplied with a pressure gauge 742. The transfer lines feeding the ports were 753, 757, 760, and 761 respectively. The foam ring was supplied with foam and water using an arrangement analogous to that shown in FIG. 2 for ring 45. While in other embodiments, the foam ring 745 is located where the second flange 673 is, for the trial, the foam ring 745 was moved 13" inches farther down the discharge apparatus 630 with a 2" ID Tygon™ hose 634 connecting the two together. The foam ring 745 was a 1 and ¾" ID to 2" ID expanding foam ring. From that point, 2 and ¼" ID Tygon™ hose 638 approximately 9 feet long led into a single leg boot 631. The densified layer discharge apparatus 730 terminates at 731. The line 790 carried sodium trimetaphosphate.

The back densified layer discharge apparatus 730 WGA was pumped from a separate tank 615 and injected into the gate 825 using a Seepex™ pump 618, which is a progressive cavity pump. The hose 639 was appropriately sized for entry into the gate 825 at port 826, close to which was provided a pressure gauge 842, for example, 0-30 p.s.i., to measure WGA pressure entering the port 826. WGA usage for the densified layer was designed to be approximately 10% of the main field slurry WGA usage. The WGA was injected into a ¼" pipe that in other embodiments can be the point where foam and water are added to the extractor. A 1" ID foam injection ring 845 was installed approximately 10" inches downstream of where the WGA was being injected into the discharge apparatus 730. The injection ring 845 included an injection port 848 to which a transfer line 834 supplied foam and water.

Although other WGA efficiencies can be used, for example, 42 lbs/MSF for ½" product, this trial used a WGA with an efficiency of 60 lbs/MSF, where MSF stands for thousand square feet. This relatively low efficiency was addressed by using a manufacturing procedure that evaluates viscosity versus grinding time in a horizontal media mill from Premier. This manufacturing procedure involved the use of a targeted viscosity as an indication of when to cease grinding—as opposed to grinding mill load or a constant grinding time. The viscosity can be measured by using any commercially available viscometer, for example, one produced by Brookfield. The development of the relationship between WGA efficiency and its viscosity is discussed in U.S. Pat. No. 6,409,825, as well as in U.S. Pat. No. 7,718,019.

WGA efficiency was measured with the same procedure as the one used to determine HRA efficiency, which involves evaluating the rate of the hydration using a standard stucco and the WGA or HRA of interest. Climate stable accelerator (CSA) can also be used as a standard. The rate of hydration of the sample is compared with the rate of hydration using the same standard stucco and a standard accelerator. If the WGA or HRA is more effective in accelerating the hydration process compared to the standard accelerator, a efficiency of more than 100 will be given. The rate of hydration is typically determined by measuring the temperature profile against time in a fully insulated environment because the hydration process is an exothermic reaction. At the end of the exothermic reaction or full hydration, the material will reach a constant temperature. Basically, how fast a stucco/water slurry can reach the constant temperature will provide the rate of hydration. WGA, HRA or other accelerator has been used to reduce the time to the constant temperature. HRA is described in further detail in U.S. Pat. No. 7,718,019.

The trial was conducted on ½" production at 180 feet per minute. The introduction of WGA outside the mixer trial was conducted for 1¾ hours, trials of shorter or longer duration are also possible. The introduction of WGA inside the mixer was conducted for approximately 10 minutes before a small lump caused a paper break, which forced shutdown of the boardline. The lump may have been the result of changing from the outside of the mixer configuration to inside the mixer configuration, a change that caused the port from the densified layer discharge apparatus to become plugged.

Stiffening rates were approximately 21 seconds for the back densified layer and 30 seconds for the main slurry. Hardness tests using a USG durometer tester just before the knife measured 67 to 70. When a board knife sample was checked off line, the hardness across the board was very uniform. The boards made during the trial did not show any paper-densified layer bond problem. Nail pull values were typical of board made with HRA.

On-line hydration Temperature Rise measuring System (TRS) during WGA trial was as follows: At 15:17, time to 50% hydration was 4.1 minutes on densified layer, 52.8% hydration at knife. At 15:27, time to 50% hydration was 3.6 minutes on main slurry, 58.6% hydration at knife. At 15:38, time to 50% hydration was 3.9 minutes on densified layer, 54.1% hydration at knife. At 15:51, time to 50% hydration was 3.8 minutes on main slurry. 57.4% hydration at knife.

EXAMPLE 2

Figure 9:
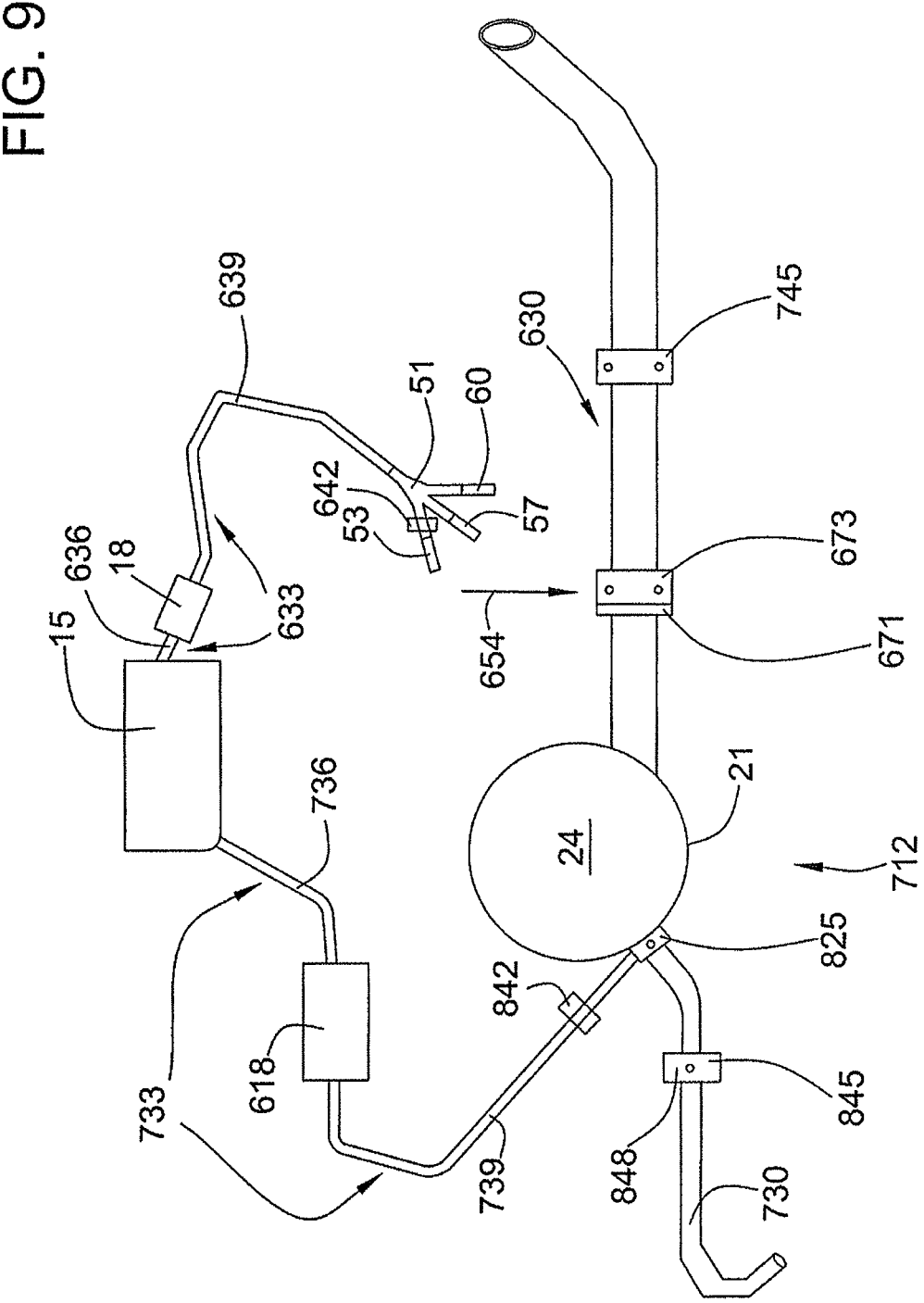
FIG. 9 shows a schematic plan view of a variation of the system depicted in FIG. 8.

Another trial is run, similar, to that described in Example 1, except that a single WGA source 15 is used to supply both discharge apparatuses 630, 730, and no WGA is supplied to the mixer 24. For this trial a system 712, as shown in FIG. 9, is employed, which is a variation on the system 612. The system 712 includes a single source 15 and lacks a WGA transfer line to the mixer. The system 712 is advantageous as only a single source need be used.

EXAMPLE 3

Figure 10:
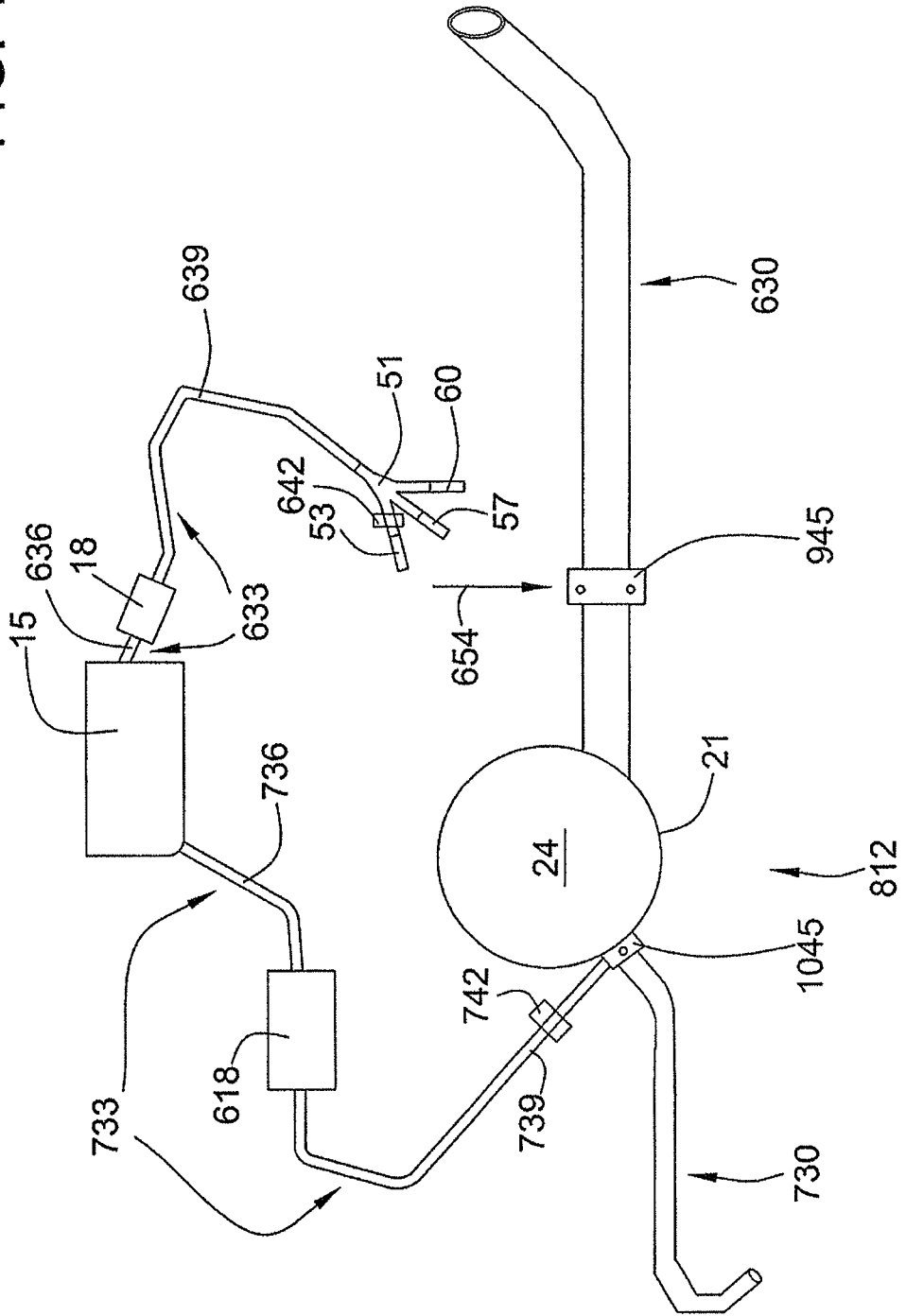
FIG. 10 shows a schematic plan view of a variation of the system depicted in FIG. 9.

Still another trial is performed, similar, to that described in Example 2, but utilizing a further refined system 812. Unlike systems 612 and 712, the system 812 as shown in FIG. 10 includes a single injection ring 945 on the main discharge apparatus 630. The injection ring 945 is operatively associated with at least one tee 63 set-up in a manner analogous to that for injection ring 45 shown in FIG. 3. The densified layer discharge apparatus eliminates the ring 845, and injects both foam and WGA at the gate 1045 using a tee 63 set-up in a manner analogous to that for injection ring 45 shown in FIG. 3.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention, especially in the context of the following claims, are to be construed to cover both the singular and the plural, unless otherwise indicated herein or clearly contradicted by context. The terms "comprising," "having," "including," and "containing" are to be construed as open-ended terms, that is, meaning "including, but not limited to," unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language, for example, "such as", provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of introducing a production additive comprising a starch solution to a post-mixer aqueous dispersion of calcined gypsum, the method comprising:
    forming an aqueous dispersion of calcined gypsum in a mixer chamber;
    discharging the aqueous dispersion into a discharge apparatus;
    introducing a production additive comprising a starch solution into the aqueous dispersion within the discharge apparatus, wherein the production additive has a viscosity of about 2000 centipoises to about 4000 centipoises, wherein the aqueous dispersion of calcined gypsum has a viscosity, and wherein a ratio of the viscosity of the production additive to the viscosity of the aqueous dispersion is between about 10:1 to about 2:1.

2. The method of claim 1, wherein the ratio of the viscosity of the production additive to the aqueous dispersion is between about 4:1 to about 2:1.

3. The method of claim 1, wherein the production additive further comprises an accelerator.

4. The method of claim 3, wherein the accelerator comprises a wet gypsum accelerator (WGA).

5. The method of claim 1, wherein the production additive further comprises foam.

6. A method of introducing a production additive comprising a starch solution to a post-mixer aqueous dispersion of calcined gypsum, the method comprising:
    forming an aqueous dispersion of calcined gypsum in a mixer chamber;
    discharging the aqueous dispersion into a discharge apparatus;
    introducing a production additive comprising a starch solution into the aqueous dispersion within the discharge apparatus, wherein the production additive has a viscosity of about 2500 centipoises to about 5500 centipoises, wherein the aqueous dispersion of calcined gypsum has a viscosity, and wherein a ratio of the viscosity of the production additive to the viscosity of the aqueous dispersion is between about 10:1 to about 2:1.

7. The method of claim 6, wherein the ratio of the viscosity of the production additive to the aqueous dispersion is between about 4:1 to about 2:1.

8. The method of claim 6, wherein the production additive further comprises an accelerator.

9. The method of claim 8, wherein the accelerator comprises a wet gypsum accelerator (WGA).

10. The method of claim 6, wherein the production additive further comprises foam.

* * * * *